United States Patent
Fergen et al.

(10) Patent No.: US 9,573,359 B2
(45) Date of Patent: Feb. 21, 2017

(54) METHOD AND DEVICE FOR PRODUCING AND TRANSFERRING DIFFRACTIVE MICROSTRUCTURES TO A PRINTING MATERIAL AND PRINTING PRESS HAVING THE DEVICE

(71) Applicant: HEIDELBERGER DRUCKMASCHINEN AG, Heidelberg (DE)

(72) Inventors: Immanuel Fergen, Karlsruhe (DE); Martin Schmitt-Lewen, Heidelberg (DE); Andreas Henn, Neckargemuend (DE); Joachim Sonnenschein, Muehltal (DE); Karl-Heinz Walther, Rottendorf (DE); Thorsten Euler, Darmstadt (DE); Martin Haas, Darmstadt (DE); Evgeny Kurmakaev, Obertshausen (DE); Marcel Mahner, Karpen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 348 days.

(21) Appl. No.: 14/061,890

(22) Filed: Oct. 24, 2013

(65) Prior Publication Data
US 2014/0109782 A1    Apr. 24, 2014

(30) Foreign Application Priority Data
Oct. 24, 2012  (DE) .................. 10 2012 020 897

(51) Int. Cl.
B44B 5/00    (2006.01)
B41F 19/00   (2006.01)
(Continued)

(52) U.S. Cl.
CPC .......... *B41F 19/002* (2013.01); *B41F 19/004* (2013.01); *B41F 19/02* (2013.01); *B41F 19/062* (2013.01);
(Continued)

(58) Field of Classification Search
None
See application file for complete search history.

(56) References Cited

U.S. PATENT DOCUMENTS 3,236,712 A  *  2/1966  Mason .................... B41F 19/02
                                                              156/231
5,763,049 A       6/1998  Frey et al.
(Continued)

FOREIGN PATENT DOCUMENTS

CA    2155850 A1    8/1994
CN    1433358 A     7/2003
(Continued)

OTHER PUBLICATIONS

German Patent and Trademark Office Search Report, Dated May 7, 2013.

*Primary Examiner* — Jill Culler
(74) *Attorney, Agent, or Firm* — Laurence A. Greenberg; Werner H. Stemer; Ralph E. Locher

(57) ABSTRACT

A method and a device for producing and transferring diffractive microstructures to a printing material include applying a fluid to an embossing cylinder and there, during the rotation of the embossing cylinder, solidifying the fluid to such an extent that the fluid is transferred to a printing material in the manner of a film with a solidified microstructure. The embossing cylinder has a cover which is preferably constructed to be either soft as a "flexoshim" or hard as a "nickel shim." A web-fed or sheet-fed rotary printing press having the device is also provided.

9 Claims, 3 Drawing Sheets

(51) Int. Cl.
   *B44B 5/02*      (2006.01)
   *B41F 19/06*     (2006.01)
   *B41F 19/02*     (2006.01)
   *B29C 41/26*     (2006.01)

(52) U.S. Cl.
   CPC ............ *B44B 5/0009* (2013.01); *B44B 5/026* (2013.01); *B29C 41/26* (2013.01); *B44B 5/009* (2013.01)

(56) References Cited

U.S. PATENT DOCUMENTS

| | | | |
|---|---|---|---|
| 5,928,762 A * | 7/1999 | Aizawa | B29C 43/222 428/156 |
| 6,120,636 A * | 9/2000 | Nilsen | B29C 41/26 156/230 |
| 6,296,731 B1 * | 10/2001 | Fujii | B29C 43/222 156/209 |
| 6,482,286 B1 * | 11/2002 | Harvey | A44B 18/0049 156/244.27 |
| 6,521,324 B1 | 2/2003 | Debe et al. | |
| 6,676,869 B2 | 1/2004 | Berg et al. | |
| 7,141,295 B2 * | 11/2006 | Genzabella | B32B 5/14 427/258 |
| 2008/0245249 A1 | 10/2008 | Muehlich | |
| 2011/0195266 A1 | 8/2011 | Spoto et al. | |

FOREIGN PATENT DOCUMENTS

| | | |
|---|---|---|
| CN | 102180045 A | 9/2011 |
| CN | 102582340 A | 7/2012 |
| DE | 4132476 A1 | 4/1993 |
| DE | 10048206 A1 | 4/2002 |
| DE | 102004014373 A1 | 10/2005 |
| DE | 60222018 T2 | 5/2008 |
| EP | 0141751 A2 | 5/1985 |
| EP | 0836927 A1 | 4/1998 |
| EP | 2055479 A2 | 5/2009 |
| FR | 2800318 A1 | 5/2001 |
| GB | 2456612 A | 7/2009 |
| WO | 9741463 A1 | 11/1997 |
| WO | 0227098 A1 | 4/2002 |
| WO | 2011097483 A1 | 8/2011 |

* cited by examiner

METHOD AND DEVICE FOR PRODUCING AND TRANSFERRING DIFFRACTIVE MICROSTRUCTURES TO A PRINTING MATERIAL AND PRINTING PRESS HAVING THE DEVICE

CROSS-REFERENCE TO RELATED APPLICATION

This application claims the priority, under 35 U.S.C. §119, of German Patent Application DE 10 2012 020 897.9, filed Oct. 24, 2012; the prior application is herewith incorporated by reference in its entirety.

BACKGROUND OF THE INVENTION

Field of the Invention

The invention relates to a method and a device for producing diffractive microstructures, e.g. holograms or other fine structures, which are transferred to printing materials made of paper, board or film. The invention also relates to a printing press having the device.

German Patent Application DE 41 32 476 A1 has disclosed a device for producing holograms or other fine structures and transferring the same to a printing material. In that case, provision is made for an applicator roll to apply a varnish layer to a printing cylinder. The printing cylinder is formed as a quartz or acrylic glass cylinder and has a UV light source in the interior. The printing cylinder has a matrix carrying the hologram as a surface relief structure. A paper web wraps around the printing cylinder. In the wrap area, the UV light source acts on the varnish layer from the interior of the cylinder, so that the varnish layer with the impressed microstructure is deposited on the paper web in the wrap area.

In the event of a job change, the entire quartz or acrylic glass cylinder must be replaced by a new one.

SUMMARY OF THE INVENTION

It is accordingly an object of the invention to provide a method and a device for producing and transferring diffractive microstructures to a printing material and a printing press having the device, which overcome the hereinafore-mentioned disadvantages of the heretofore-known methods, devices and printing presses of this general type and in which a fluid applied to a printing cylinder is solidified before transfer to a printing material carrier.

With the foregoing and other objects in view there is provided, in accordance with the invention, a method for producing and transferring diffractive microstructures to a printing material. The method comprises applying a fluid to an embossing cylinder, and initially drying the fluid onto the printing material in a region between an application point and a transfer point, fixing the microstructures in the fluid and transferring solidified fluid to the printing material in the form of a film.

With the objects of the invention in view, there is also provided a device for producing and transferring diffractive microstructures to a printing material. The device comprises an embossing cylinder having a cylinder body with a periphery and a cover disposed on the periphery of the cylinder body, the cover having a surface relief structure, and a cylinder configured to apply a fluid to the embossing cylinder.

Particularly advantageously, a microstructure is molded in the fluid applied to the embossing cylinder and, by using dryers or hardening sources that are provided, is solidified to such an extent that the fluid can be deposited on the printing material as a film. The carrier material used for the diffractive microstructures, such as holograms or other fine structures, is a fluid, for example a UV varnish, flexographic printing ink or offset ink.

Particularly advantageously, the printing cylinder includes a cylinder body and a cover which is carried on the circumference of the cylinder body and which has a surface relief structure.

Advantageously, the printing cylinder, formed as an embossing cylinder, has a cover made of a soft material (silicone, rubber, elastomer) with a Shore hardness of about 20 to 70 ShA.

The soft cover is preferably made of a flexible silicone sheet which is applied to the printing cylinder, for example by adhesive bonding. This flexible silicone sheet, also designated as a "flexoshim," has at least one surface relief structure.

As an alternative to a soft cover, in order to increase service lives, a hard cover made of metal, e.g. a so-called "nickel shim" is used.

The "flexoshim" or "nickel shim" can be replaced simply by a new one during a job change.

Advantageously, following transfer, the carrier material solidified by drying/hardening automatically adheres to the printing material being used.

In order to improve the adhesive property, the printing material can be provided with an adhesive layer before the transfer point from the printing cylinder to the printing material.

The formation of an applicator roll interacting with the printing cylinder and having the same diameter is particularly advantageous. Through the use of this measure, the applicator roll can, for example, be an engraved gravure printing cylinder, which transfers the liquid carrier material accurately point by point to selected areas of the embossing cylinder or the flexoshim or nickel shim.

Other features which are considered as characteristic for the invention are set forth in the appended claims.

Although the invention is illustrated and described herein as embodied in a method and a device for producing and transferring diffractive microstructures to a printing material and a printing press having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
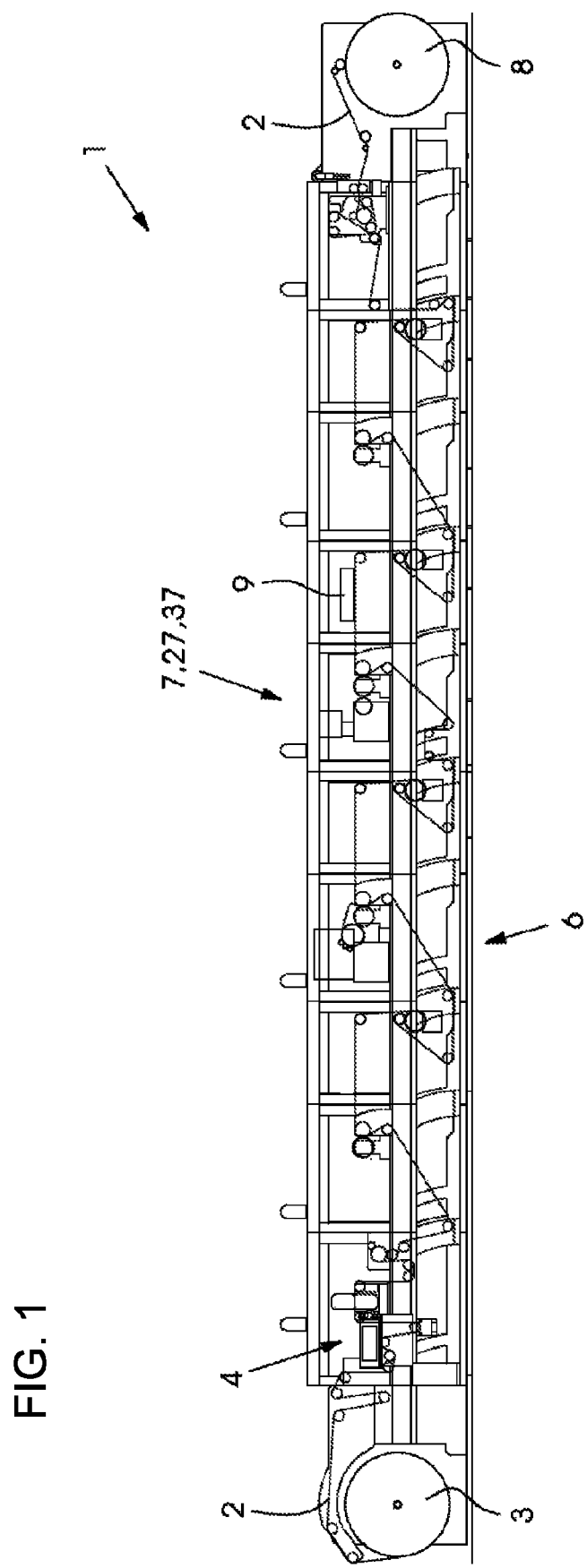
FIG. 1 is a diagrammatic, longitudinal-sectional view of a transfer embossing device with a printing material web.

Referring now to the figures of the drawings in detail and first, particularly, to FIG. 1 thereof, there is seen a transfer embossing device 1, in which a printing material web 2 from a roll 3 is fed to different processing stations 4, 6, 7 and is then wound up on a take-up roll 8. A first processing station 4 includes a corona installation for processing the printing material in order, in particular, to improve the surface properties of the latter. A second processing station 6 includes an offset printing unit which, if appropriate, is provided for an application of adhesive to the printing material. A fourth processing station 7 includes a transfer embossing station according to the invention.

A dryer 9, for example a hot air dryer and/or infrared dryer, which promotes hardening and drying of an embossed relief structure (e.g. hologram), is connected downstream of the processing station 7.

Of course, further processing stations, such as printing units, can also be disposed before and/or after the transfer embossing station 7.

Figure 2:
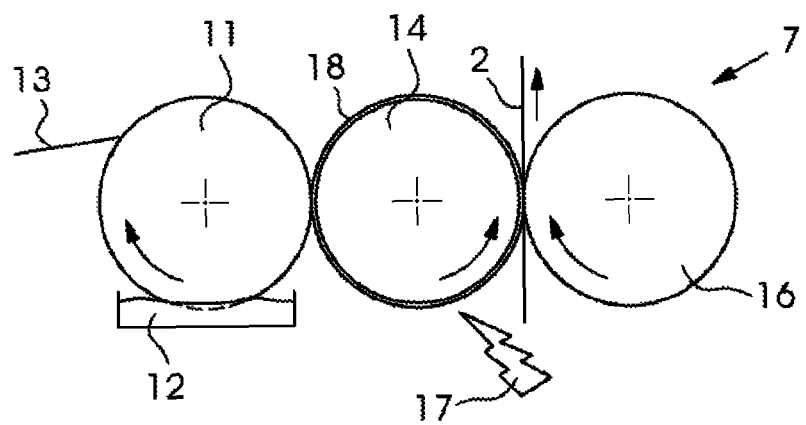
FIG. 2 is a front-elevational view of a transfer embossing unit having an engraved roll or a gravure printing cylinder.

FIG. 2 shows the transfer embossing station 7, which has a form cylinder 11, for example a gravure printing cylinder or an engraved roll, which scoops an easily hardened fluid, for example varnish or ink, out of a fluid reservoir 12, for example an ink trough, and feeds that fluid as a thin layer, produced by a doctor 13, to a nip between an embossing cylinder 14 and an impression cylinder 16. In this roller nip/press nip, a diffractive microstructure produced in the fluid is deposited on the printing material web 2, to which the microstructure automatically adheres.

In order to improve the drying or hardening of the fluid on the embossing cylinder 14, a dryer 17, for example an infrared dryer, is provided, which is aimed at the circumferential surface of the embossing cylinder 14 in a transport area of the fluid between the form cylinder 11 and the impression cylinder 16.

The embossing cylinder 14 has a cover 18, a so-called "flexoshim." The latter is, for example, a cast silicone sheet with a hardness of, for example, 20 to 70 ShA. The silicone sheet has a relief structure to be embossed, in particular a micro-embossing silicone structure with low surface energy. The flexoshim 18 is preferably adhesively bonded to the circumferential surface of the embossing cylinder 14.

Figure 3:
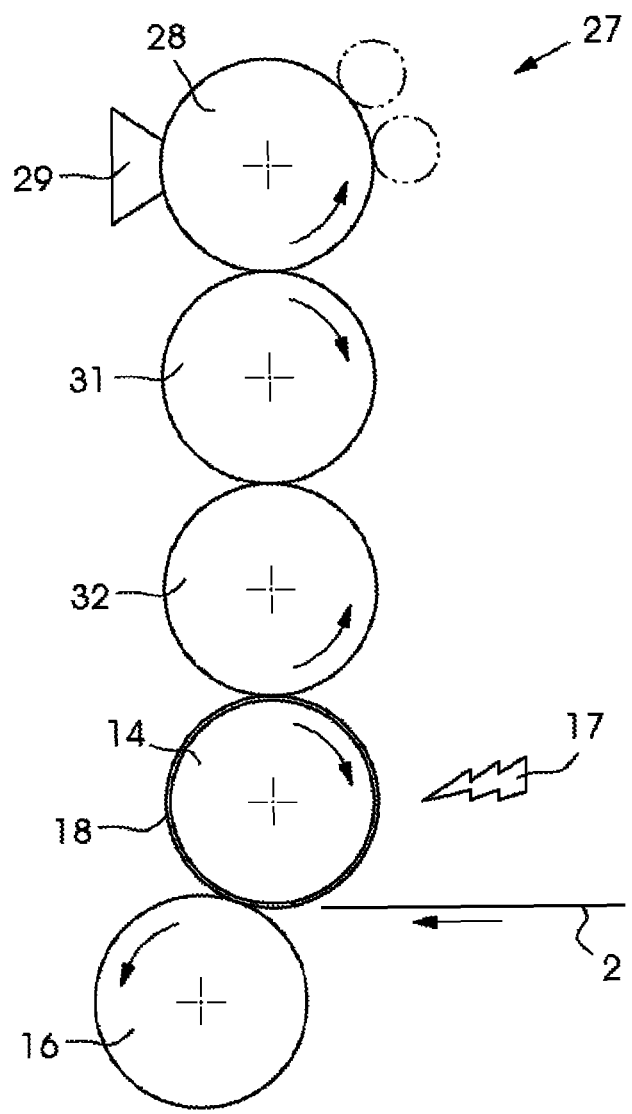
FIG. 3 is a front-elevational view of a transfer embossing unit for flexographic printing inks, offset inks or varnishes.

FIG. 3 shows an alternative transfer embossing unit 27 having an engraved roll 28, which is loaded with UV varnish, flexographic printing ink or offset printing ink by a doctor system 29, for example a chamber-type doctor. The engraved roll 28 transfers the fluid to a first ink transfer cylinder 31 having a soft surface. The latter transfers the fluid to a second ink transfer cylinder 32 having a hard surface, which can be formed by a flat printing plate, for example. The second ink transfer cylinder 32 transfers the fluid to the flexoshim 18 of the embossing cylinder 14. Drying/ hardening equipment 17 aimed at the embossing cylinder 14 promotes the hardening of the fluid, which is transferred to the printing material 2 in a press nip between the embossing cylinder 14 and the impression cylinder 16.

Figure 4:
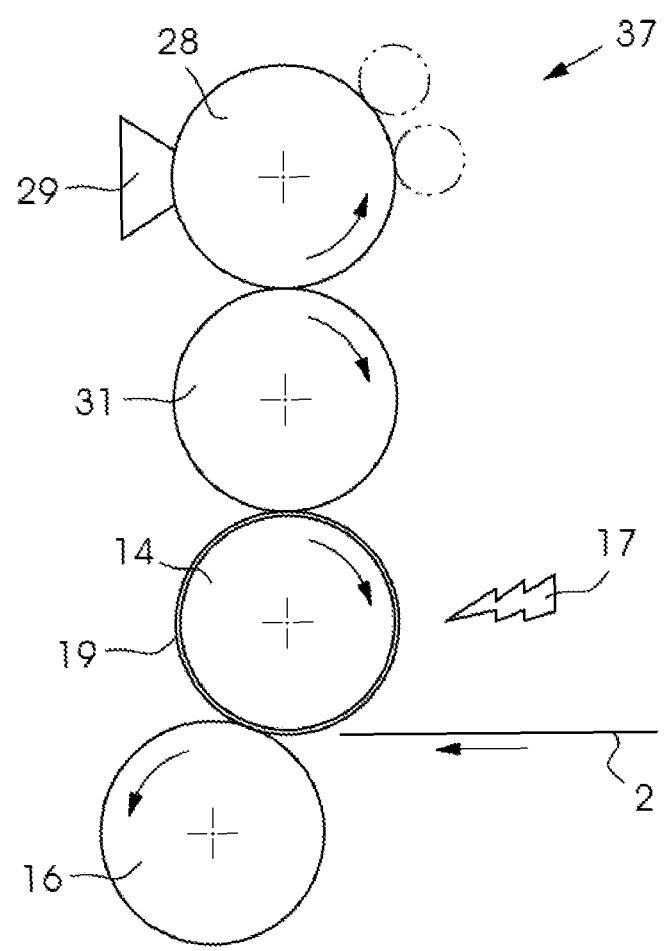
FIG. 4 is a front-elevational view of a transfer embossing unit with a hard "nickel shim" cover on an embossing cylinder.

FIG. 4 shows a further alternative transfer embossing unit 37 having an engraved roll 28 which is loaded with UV varnish, flexographic printing ink or offset printing ink by a doctor system 29, for example a chamber-type doctor. The engraved roll 28 transfers the fluid to an ink transfer cylinder 31 having a soft surface. The latter transfers the fluid to a hard cover 19 of the embossing cylinder 14. Drying/ hardening equipment 17 aimed at the embossing cylinder 14 promotes the hardening of the fluid, which is transferred to the printing material 2 in a press nip between the embossing cylinder 14 and the impression cylinder 16. The hard cover 19 is produced from a metallic material, e.g. nickel (nickel shim), in order to increase service lives.

The covers 18, 19 can be fixed to the embossing cylinder 14 by using clamping devices. These are preferably adhesively bonded on or, in the case of the nickel shim 19, held by magnetic force.

The engraved roll 28, the ink transfer cylinders 31, 32 and the embossing cylinder 14 with the flexoshim 18 or nickel shim 19 preferably have the same diameters.

In the method according to the invention, provision is made for the fluid into which the extremely fine embossing of diffractive structures is performed to be dried on the embossing cylinder 14, 18; 14, 19 or at least initially dried, so that in the course of the initial drying, the extremely fine embossing (texture) is fixed in the fluid. The initial drying of the fluid in the case of water-based varnishes as fluid is promoted by thermal drying. When UV-hardening varnishes are used, corresponding UV hardeners are provided. The dryers/hardeners are preferably aimed from outside at a region of the embossing cylinder which is located between a fluid transfer point to the embossing cylinder 14 and a discharge point on the printing material 2. The solidified film-like fluid is deposited on the printing material 2 at the discharge point.

In order to improve the drying or thermal hardening, provision can be made for the thermal energy to be introduced from the cylinder side. In this case, the cylinder can be heated or heating elements, e.g. in the form of heating mats, can be laid under the silicone shim 18. If desired, the silicone shim can have integrated CNT (carbon nanotube) elements for reinforcement and, in the case of thermal hardening, to increase the IR, laser or radiation absorption. The silicone shim 18 can also be cast with a CNT heating mat and/or have a wire fabric for reinforcement. The silicone shim 18 can also have laser absorbers (black coloration or absorbers operating in a wavelength-selective manner).

For the purpose of inking the embossing form 18, 19, the following alternative measures are suggested: gravure printing form, inkjet system (digitally positioned holograms), spraying processes, offset printing unit, in which a press blanket has the micro-embossing structure, at least in parts, e.g. by using inserted silicone elements with an embossed pattern. In this case, the offset printing plate partially inks the embossing components.

When an offset printing unit is used, the press blanket is replaced by a silicone shim, with the offset printing plate inking the silicone shim partially or on the basis of an image.

The following media are suggested as fluids: varnish (transparent or colored), printing inks, liquid toners, metalized varnishes, varnishes with effect pigments, gelatin, other film-forming fluids.

In order to accelerate the drying/hardening of the fluid on the embossing cylinder before the transfer to a printing material, the following measures are suggested: hot air, IR, UV, electron beam drying, laser drying, combination of various methods.

The following media can preferably be used as printing materials: paper/board with and without pre-print, film with and without pre-print, metalized substrates, other 2D surfaces (aluminum blister, glass, plastic board, etc.).

Of course, it is also possible to print 3D objects in a manner similar to the applications in pad printing or foodstuffs or tablets by using the method according to the invention.

In order to increase the adhesive force of the initially dried fluid to the printing material, in addition to the use of adhesive, the following media are also suggested: varnish, ink, gelatin, electrostatic forces.

The following are suggested as alternative types of embossing: diffractive structures for hologram-like effects, micro-roughnesses (lotus structures), matting, optical structures (moth eyes), lenticular-type structures, textures.

The invention claimed is:

1. A method for producing and transferring diffractive microstructures to a printing material, the method comprising the following steps:
   providing paper or board as the printing material;
   providing an embossing cylinder with a surface relief microstructure for producing the diffractive microstructures;
   providing an engraved roll;
   applying a fluid to the embossing cylinder at an application point by using the engraved roll;
   initially drying the fluid in a region between the application point and a transfer point onto the printing material, thereby solidifying the fluid and fixing the diffractive microstructures in the fluid; and
   transferring the solidified fluid with the fixed diffractive microstructures to the printing material in the form of a film.

2. The method according to claim 1, which further comprises in the region between the application point of the fluid and the transfer point of the fluid onto the printing material, acting on the fluid by using at least one of temperature-control or hardening radiation before contact with the printing material.

3. The method according to claim 1, wherein the embossing cylinder is provided with a cover having a material hardness of 20 to 70 ShA.

4. The method according to claim 3, wherein the cover of the embossing cylinder is formed of silicone, rubber or an elastomer.

5. The method according to claim 1, wherein the embossing cylinder is provided with a cover formed of a metallic material.

6. The method according to claim 5, wherein said metallic material is a nickel material.

7. The method according to claim 1, wherein the engraved roll and the embossing cylinder have the same diameter.

8. The method according to claim 1, wherein the fluid is UV varnish, a transparent varnish, flexographic printing ink or offset printing ink.

9. The method according to claim 1, wherein the surface relief structure of the embossing cylinder has a sufficiently fine resolution to produce the diffractive microstructures.

* * * * *